United States Patent
Eudes et al.

(10) Patent No.: US 7,127,006 B2
(45) Date of Patent: Oct. 24, 2006

(54) METHOD FOR TRANSMITTING FRAMES COMPRISING BURSTS MODULATED WITH DIFFERENT MODULATION SCHEMES ON RADIO COMMUNICATION CHANNEL

(75) Inventors: Jacques Eudes, Clichy (FR); Valérie Cueff, Paris (FR); Marc Isard, St. Germain en Laye (FR)

(73) Assignee: Alcatel, Paris (FR)

( * ) Notice: Subject to any disclaimer, the term of this patent is extended or adjusted under 35 U.S.C. 154(b) by 907 days.

(21) Appl. No.: 10/157,948

(22) Filed: May 31, 2002

(65) Prior Publication Data
US 2003/0012298 A1 Jan. 16, 2003

(30) Foreign Application Priority Data
Jul. 5, 2001 (EP) .................................. 01440207

(51) Int. Cl.
H04L 27/36 (2006.01)
(52) U.S. Cl. ................ 375/298; 375/295; 375/261
(58) Field of Classification Search ................ 375/295, 375/298, 308, 261, 279, 297, 222
See application file for complete search history.

(56) References Cited

U.S. PATENT DOCUMENTS

| 5,051,981 | A * | 9/1991 | Kline | 370/290 |
| 6,452,964 | B1 * | 9/2002 | Yoshida | 375/222 |
| 6,865,235 | B1 * | 3/2005 | Khoini-Poorfard | 375/272 |
| 2002/0099529 | A1 * | 7/2002 | Tang | 703/22 |
| 2002/0114379 | A1 * | 8/2002 | Uesugi et al. | 375/219 |
| 2005/0286653 | A1 * | 12/2005 | Lai et al. | 375/308 |

FOREIGN PATENT DOCUMENTS

| EP | 0 848 515 A2 | 6/1998 |
| WO | WO 00/03523 A1 | 1/2000 |
| WO | WO 00/76109 A1 | 12/2000 |
| WO | WO 00/76114 A1 | 12/2000 |

* cited by examiner

*Primary Examiner*—Temesghen Ghebretinsae
(74) *Attorney, Agent, or Firm*—Sughrue Mion, PLLC

(57) ABSTRACT

The invention relates notably to a method for transmitting frames on a radio communication channel (RCC), the frames comprising a succession of bursts (B1, . . . , Bn) modulated with at least two different modulation schemes (M1, M2, M3) having different modulation efficiencies, each modulation scheme (M1, M2, M3) having a corresponding average transmitted power.

The method according to the invention comprises the steps of:
mapping information to be transmitted to modulation symbols using one of the modulation schemes (M1, M2, M3);
filtering the modulation symbols using a digital transmission filter with a set of coefficients, the set being chosen from at least two sets of coefficients depending on the modulation scheme (M1, M2, M3) used at the mapping step, the product of the average transmitted power and the gain of the digital transmission filter being smaller than a predefined value for all modulation schemes (M1, M2, M3).

9 Claims, 2 Drawing Sheets

$$Filter(QPSK) = \sqrt{\frac{10}{18}} Filter(16QAM)$$

METHOD FOR TRANSMITTING FRAMES COMPRISING BURSTS MODULATED WITH DIFFERENT MODULATION SCHEMES ON RADIO COMMUNICATION CHANNEL

BACKGROUND OF THE INVENTION

The present invention relates to transmission of frames on a radio communication channel, wherein the frames contain bursts modulated with different modulation schemes.

In radio communication networks, several modulation schemes can be used at the same transmitter depending on the receiver to which the data are destined. The modulation scheme may be, for example, determined for each receiver so that a predefined carrier to interference ratio is ensured. Usually, it is advantageous to select modulation schemes with different modulation efficiency, the modulation efficiency being defined as the number of data bit per modulation symbols. The higher the number of bit per modulation symbols, the more efficient the modulation. Indeed, a modulation with a high efficiency will be used to communicate with receivers located in a zone subjected to a low amount of interference while a more resistant modulation (i.e. with a lower efficiency) will be used to communicate with receivers located in a zone with a high level of interference.

FIG. 1 represents a simplified radio communication network where several modulations schemes M1, M2, M3 can be used for communicating between a base station 10 and several end-user radio terminals 11, 12, 13. Depending on the location of the radio terminals 11, 12, 13 or on the end-user profile, the core network associates an appropriate modulation scheme M1, M2, M3 with a corresponding modulation efficiency to each radio terminal respectively 11, 12, 13. As a consequence, base station 10 using TDM (time division multiplex) for communicating with radio terminal 11, 12, 13 sends frames containing bursts B1, B2, B3 . . . modulated respectively with modulations schemes M1, M2, M3 and destined respectively to radio terminals 11, 12, 13 . . .

Such mechanisms increase substantially the capacity of the network and are especially used in fixed wireless networks such as Local Multipoint Distribution Services (LMDS) networks. In fixed wireless networks, the end-users are not moving, the interference level affecting each user is thus easy to determine, and a static association of a modulation scheme to each user is easily possible. However, in mobile communication networks, such a mechanism is also possible provided the interference level experienced at each end-user radio terminal is reported to the core network at regular time intervals so that the modulation scheme is accordingly dynamically modified.

The data modulated with different modulation schemes (bursts) destined to different users are then encapsulated in a frame at the transmitter and transmitted on the air interface.

Usual modulation schemes can be represented by a modulation constellation. The term modulation constellation refers to the geometric representation of the modulation symbols constituting the modulation. Each point on the constellation represents the coordinates of a modulation symbol. Represented in a polar coordinate system, the constellation gives for each modulation symbol its phase and its amplitude. A characteristic value of a modulation is its average transmitted power, which can be calculated as the sum of the power (proportional to the square of amplitude) of each modulation symbol divided by the total number of modulation symbols. For example, the average transmitted power for a QPSK modulation equals $2*a^2$ if the modulation constellation comprises four modulations symbols belonging to the groups of (P;Q):=(+/−a;+/−a) (a being the amplitude of the signal), for a 16 QAM $10*a^2$ if the modulation constellation comprises sixteen modulations symbols belonging to the groups of (P;Q)=(+/−a;+/−a) (+/−3a;+/−a) (+/−a;+/−3a) (+/−3a;+/−3a) and for a 64 QAM $40*a^2$.

In a frame comprising bursts modulated with different modulation schemes, the average transmitted power observed at the scale of a frame varies (e.g. jumping from $2*a^2$ if a burst is modulated with a QPSK modulation to $40*a^2$ if the next burst is modulated with a 64 QAM and so on).

Varying average transmitted power has the disadvantage to cause unpredictable interference in the network that cannot be easily dealt with while trying to increase network capacity. Indeed, the average transmitted power variations may increase inter-symbol -interference.

A known solution is shown on FIG. 2 and consists in putting a multiplier stage 23 at the output of the digital part of the modulator 20 (i.e. after a mapping module 21 and a digital transmission filter 22) in the transmission chain to regulate the transmitted power and keep it constant. This multiplier stage 23 has the function of an automatic gain controller which selectively amplifies the bursts modulated with a modulation having a low average transmitted power while attenuating the bursts having a high average transmitted power to a predefined constant power value P.

The multiplier stage 23 must be controlled by the mapping module 21 in order to know which modulation has been applied to the current burst and as a consequence which gain it should apply to this burst. Then, the digital signal is supplied to a digital/analog converter 24 and transmitted on the radio communication channel.

This solution presents the disadvantage to require a complex control mechanism to synchronise the mapping module 21 with the multiplier stage 23. Indeed a delay must be taken into account to control the multiplier stage 23 what results in an increased complexity of the transmit chain by requiring additional ASIC gates in the transmitter.

Moreover, the inter-symbol-interference is not eliminated at the transition between two different modulation schemes and some symbols are lost between the digital transmission filter 22 and the multiplier stage 23. In order to improve this method, a preamble or guard symbols must be included between two bursts modulated with different modulations. This reduces the bad effects of the inter-symbol interference since the lost symbols are dummy symbols belonging to the preamble and not traffic data. However, such a solution reduces the capacity of the network since a part of the available bandwidth is used for the transmission of dummy symbols.

Moreover, this solution implies a double rounding operation: one rounding at digital filter 22 and one rounding at multiplier 23, which improves the quantization noise and degrades performances.

A particular object of the present invention is to provide a method for transmitting frames containing bursts modulated with modulation schemes having different modulation efficiency which generates a low inter-symbol interference and increases the capacity of the network.

Another object of the invention is to provide a transmitter for generating and transmitting frames according to the above mentioned method.

SUMMARY OF THE INVENTION

These objects, and others that appear below, are achieved by a method for transmitting frames on a radio communication channel, said frames comprising a succession of bursts modulated with at least two different modulation schemes having different modulation efficiencies, each modulation scheme having a corresponding average transmitted power, said method comprising the steps of:

mapping information to be transmitted to modulation symbols using one of said modulation schemes;

filtering said modulation symbols using a digital transmission filter with a set of coefficients, said set being chosen from at least two sets of coefficients depending on said modulation scheme used at said mapping step, the product of the average transmitted power and the gain of said digital transmission filter being smaller than a predefined value for all of said modulation schemes.

These objects are further attained by a for transmitting frames on a radio communication channel, said frames comprising a succession of bursts modulated with at least two different modulation schemes having different modulation efficiencies, each modulation scheme having a corresponding average transmitted power, said transmitter comprising:

a mapping module for mapping information to be transmitted to modulation symbols using one of said modulation schemes;

a digital filter with a set of coefficients for filtering said modulation symbols, said set being chosen from at least two sets of coefficients depending on said modulation scheme used at said mapping module, the product of the average transmitted power and the gain of said digital transmission filter being smaller than a predefined value for all of said modulation schemes.

According to the present invention, the product of the average transmitted power and the gain of the corresponding digital transmission filter is smaller than a predefined value for all different modulation schemes.

In a first embodiment, the digital transmission filter is chosen to have a gain which compensates for the average transmitted power difference for the different modulation schemes. For this purpose, several sets of coefficients are available at the digital transmission being applied to bursts depending on the used modulation scheme.

This embodiment presents the advantage to eliminate the inter-symbol interference. This is due to the fact that gain adaptation and filtering are performed simultaneously contrary to prior art systems where these operations were performed separately causing inter-symbol interference as well as a high complexity in the transmitter.

In a second embodiment, the average transmitted power at the output of the modulator is kept constant for all modulation schemes by choosing appropriately the modulation symbols for each modulation scheme. In a preferred embodiment of the invention, the modulations symbols of a modulation having a lower efficiency are chosen as a subset of the modulations symbols of a modulation having a higher efficiency. This implies a phase shift at the modulator when changing the modulation scheme.

This second embodiment presents also the advantage to eliminate inter-symbol interference without increasing the transmitter complexity.

Moreover, no preamble or guard symbols are required any more between two bursts in the same frame modulated with different modulation schemes.

Further advantageous features of the invention are defined in the dependent claims.

This invention is based on a priority application EP 01 44 0207 which is hereby incorporated by reference.

BRIEF DESCRIPTION OF THE DRAWINGS

Other characteristics and advantages of the invention will appear on reading the following description of a preferred embodiment given by way of non-limiting illustrations, and from the accompanying drawings, in which.

DETAILED DESCRIPTION OF THE INVENTION

Figure 1:
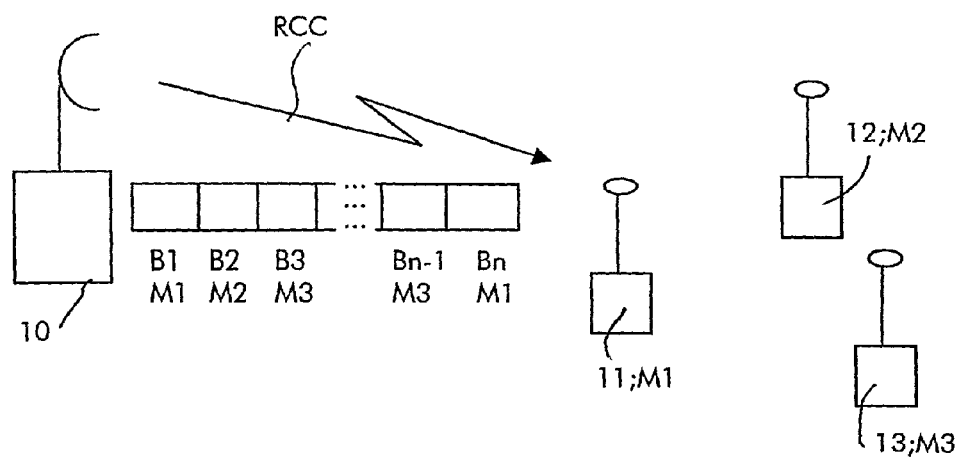
FIG. 1 shows a simplified radio communication system where the method according to the present invention can be used.
Figure 2:
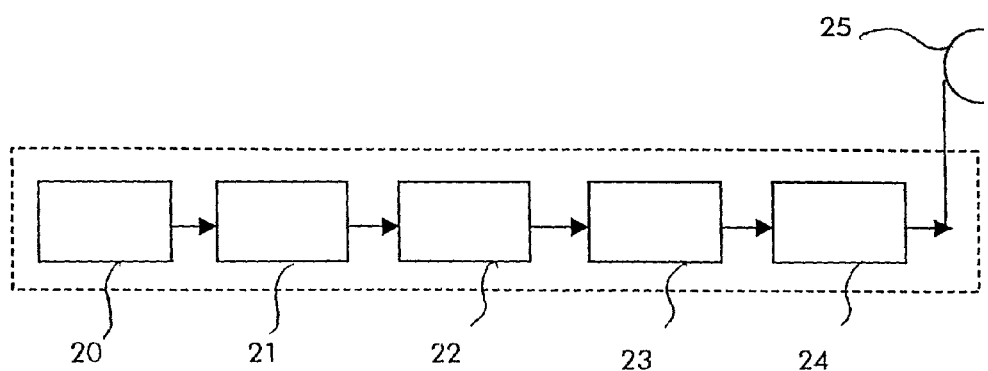
FIG. 2 shows a transmit chain keeping the average transmitted power constant while using different modulation schemes according to a prior art solution.

FIG. 1 and FIG. 2 have already been described in relation with prior art.

Figure 3:
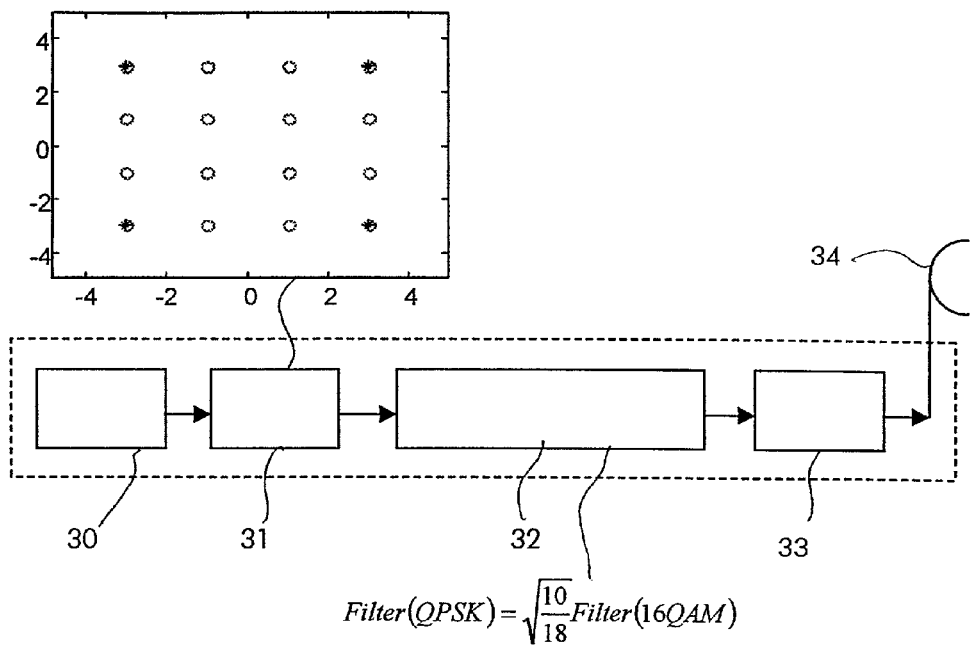
FIG. 3 shows a transmitter according to a first embodiment of the present invention.

FIG. 3 shows a transmitter according to a first embodiment of method according to the present invention. The transmitter comprises an information source 30, a mapping module 31, a digital transmission filter 32, a digital analog converter 33 and an antenna 34.

Information source 30 generates digital raw data which after processing e.g. coding, modulation . . . have to be transmitted on the radio link channel. These digital raw data may comprises packetized voice, or any other usual types of information.

The digital raw data are submitted to mapping module 31 which performs a first step of the modulation function in that it maps digital raw data to be transmitted to the end-users radio terminals 11, 12, 13 into modulation symbols belonging to the modulation constellation of one of several different modulation schemes M1, M2. For sake of simplicity, the invention will be described with only two different modulation schemes for example QPSK and 16 QAM. Nevertheless, it will be clear for a person skilled in the art that the method according the first embodiment of the present invention can be applied to any number of different modulations schemes simultaneously used to modulate bursts encapsulated in one frame.

FIG. 3a represents a classical configuration for QPSK and 16 QAM.

The constellation of the QPSK contains the four following modulation symbols: (+3P;+3Q), (−3P;+3Q), (−3P;−3Q), (+3P;−3Q). The average transmitted power of this modulation at the output of mapping module 31 equals 18.

The constellation of the 16 QAM contains the sixteen following modulation symbols: (+3P;+3Q), (−3P;+3Q), (−3P;−3Q), (+3P;−3Q), (+P;+Q), (−P;+Q), (−P;−Q), (+P;−Q), (+P;+3Q), (−P;+3Q), (−P;−3Q), (+P;−3Q) (+3P;+Q), (−3P;+Q), (−3P;−Q), (+3P;−Q). The average transmitted power of this modulation at the output of mapping module 31 equals 10.

According to the present invention, the QPSK and the 16 QAM modulation schemes have different average transmitted powers which results in a varying average transmitted power for successive bursts modulated with different modulation scheme at the output of mapping module 31.

Then, the mapped modulations symbols are submitted to digital transmission filter 32.

Digital filtering consists in multiplying each symbols with a set of coefficients to obtain a digital filtered signal. Usually, a theoretical digital filter comprises an infinite number of coefficient since it is obtained by Fourier Transformation of a finite frequency domain. Real digital filters are truncated to reduce the processing power required and consist in a limited number of coefficients covering a finite time domain. Usually, digital filters do not modify the amplitude of the digital signal but only limit its frequency spectrum.

The gain of a digital transmission filter defined by its set of coefficients is the ratio between the power of the signal at the output of the filter and the amplitude of the signal at the input of the filter.

According to the present invention, digital transmission filter 31 comprises different sets of coefficients, each set of coefficients being associated to one modulation schemes, the gain of each of said filter being chosen so that the product of the average transmitted power of any modulation scheme with the gain of the corresponding transmission filter characterized by its set of coefficients is substantially the same for all modulation schemes.

The coefficient of digital transmission filter 32 are chosen so as to limit the frequency spectrum of the digital signal and simultaneously modify its amplitude in order to obtain a predefined amplitude for all signals independently of the modulation scheme which has been used at the mapping stage 31. As a consequence, the average transmitted power of the signal at the output of the filter remains constant equal to a predefined value P for all bursts independently of the used modulation scheme. In this example, the set of coefficients used for the QPSK should have the following relation to the set of coefficients used for the 16 QAM.

$$Filter(QPSK) = \sqrt{\frac{10}{18}} Filter(16QAM)$$

In a preferred embodiment of the present invention, the difference between the product of the average transmitted power and the gain of the digital transmission filter should be smaller than a predefined value. The predefined value may be chosen equal to zero. This predefined value may also be small enough not to suffer from a variation of the average transmitted power between bursts modulated with different modulation schemes. A tolerance of 10% can be foreseen in the choice of the filter coefficients.

Then, the filtered modulation symbols are submitted to a digital analog converter 34 and transmitted over antenna 35 on a radio channel.

At the receiver side, no modification are necessary if the receiver only deals with one modulation scheme at the time. This is usually the case when the receivers are end-user radio terminals.

Figure 4:
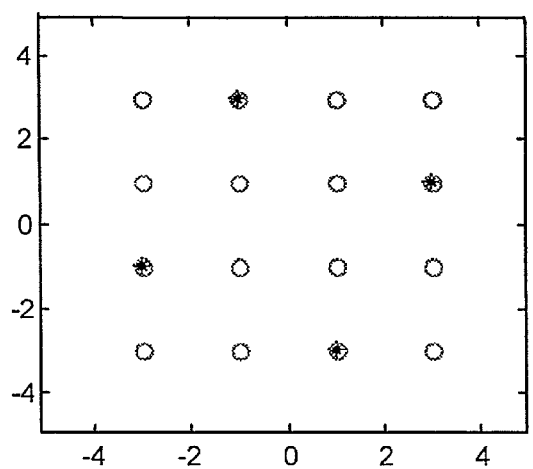
FIG. 4 shows two modulation schemes according to a second embodiment of the present invention.

FIG. 4 shows two modulation schemes according to a second embodiment of the present invention. The first modulation scheme is a 16 QAM having a average transmitted power of 10 and a modulation efficiency of 4. The second modulation is a QPSK shifted by a phase φ=arctan (⅓) compared to the phase of the 16 QAM. The average transmitted power of the phase shifted QPSK modulation equals 10 and the modulation efficiency equals 2.

According to the present invention, the modulations symbols of the QPSK forms a subset of the modulation symbols of the 16 QAM and have the same average transmitted power. Frames comprising bursts modulated by using these two modulation schemes are free of inter-symbol-interference because the average transmitted power remains constant at the output of the digital transmission filter. Hence, there is no need to include preamble between bursts modulated with different frequencies so that the capacity on the radio communication channel is increased. This second embodiment of the present invention cannot be applied to any modulation schemes. The condition for this embodiment to be possible is that the rotation of one constellation possibly modified by applying a predefined gain exactly maps a subset of another constellation.

In this embodiment of the present invention, the receiver should take into account the phase shift φ for bursts modulated with rotated modulation schemes.

It is further necessary to control the choice of the appropriate set of coefficients at digital transmission filter 32 according to the modulation scheme used at mapping module 31. This control is performed by informing digital transmission filter 32 on the modulation scheme currently used at mapping module 31. This can be provided for by mapping module 31 itself. It would however be preferably provided for by a control module not represented on FIG. 3 which controls both mapping module 31 and digital transmission filter 32. Contrary to prior art the control module needs not to take into account any time delay between mapping module and digital transmission filter since both operations are performed simultaneously.

The invention claimed is:

1. A method for transmitting frames on a radio communication channel, said frames comprising a succession of bursts modulated with at least two different modulation schemes having different modulation efficiencies, each modulation scheme having a corresponding average transmitted power, said method comprising:
   mapping information to be transmitted to modulation symbols using one of said modulation schemes; and
   filtering said modulation symbols using a digital transmission filter with a set of coefficients, said set being chosen from at least two sets of coefficients depending on said modulation scheme used during said mapping, a product of the average transmitted power and a gain of said digital transmission filter being smaller than a predefined value for all of said modulation schemes.

2. The method according to claim 1, wherein said filtering uses at least two different sets of coefficients, each set being associated to one of said modulation schemes, the value of the coefficients depending on the average transmitted power of said corresponding modulation scheme.

3. The method according to claim 2, wherein if a ratio between the average transmitted powers of two modulation schemes equals the predefined value P, a ratio between each of the coefficients of said corresponding sets of coefficients equals √P.

4. The method according to claim 2, wherein a first modulation scheme is 16 QAM and a second modulation scheme is 64 QAM.

5. The method according to claim 1, wherein said mapping uses modulation symbols for a modulation scheme with a lower efficiency constituting a subset of a modulation scheme with a higher efficiency.

6. The method according to claim 5, wherein said modulation with a lower efficiency is a QPSK modulation, said modulation with a higher efficiency being a 16 QAM modulation, the modulation constellation of the QPSK presenting a phase shift a=arctan(⅓) compared to the modulation constellation of the 16 QAM.

7. The method according to claim 1, used in a Local Multipoint Distribution Services network.

8. A transmitter which transmits frames on a radio communication channel, said frames comprising a succession of bursts modulated with at least two different modulation schemes having different modulation efficiencies, each modulation scheme having a corresponding average transmitted power, said transmitter comprising:
 a mapping module which maps information to be transmitted to modulation symbols using one of said modulation; and
 a digital filter with a set of coefficients which filters said modulation symbols, said set being chosen from at least two sets of coefficients depending on said modulation scheme used at said mapping module, a product of the average transmitted power and a gain of said digital transmission filter being smaller than a predefined value for all of said modulation schemes.

9. The transmitter according to claim 8, being a base station of a radio communication network communicating with radio terminals, wherein each radio terminal supports one of said modulation schemes.

\* \* \* \* \*